INVENTOR.
Gerhard A. Ellestad

Patented Sept. 16, 1947

2,427,451

UNITED STATES PATENT OFFICE 2,427,451

BAKING UTENSIL

Gerhard A. Ellestad, Rochester, N. Y.

Application August 26, 1944, Serial No. 551,321

5 Claims. (Cl. 99—372)

This invention relates to improvements in baking utensils such as waffle irons or the like embodying one or more baking grids.

One of the objects of my invention is to provide a baking utensil of the type described having means associated therewith for severing the baked article before it is removed from the utensil. A further object is to provide a waffle iron which is relatively simple in structure yet convenient and efficient in operation and embodies means for severing the baked waffle. Another object is to provide a waffle iron having knife means movably mounted on one of the grids and adapted to be selectively moved for cutting the baked waffle before it is removed from the waffle iron. These and other objects and advantages reside in certain novel features of construction, arrangement and combination of parts as will hereinafter be more fully described and pointed out in the appended claims.

Referring to the drawings.

Figure 1:
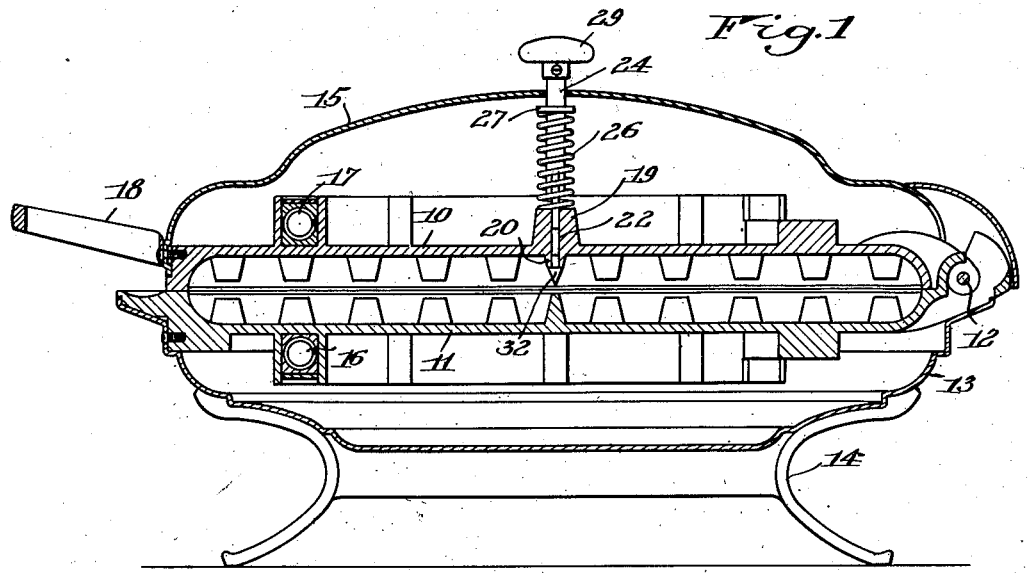
Fig. 1 is a sectional view of a waffle iron embodying my invention.

A preferred embodiment of my invention, shown in the drawings, is the waffle iron having the usual upper grid 10 connected to the lower grid 11 by the hinge member 12. The lower grid 11 is supported in the lower casing member 13 carried by the base 14 and the upper grid 10 carries the upper casing 15. The lower grid 11 may be heated by any suitable means such as the annular electrical heating unit 16 secured to the underside of the grid while the upper grid 10 is heated by a similar heating unit 17. The electrical heating units are connected by suitable means, not shown, to a source of electrical current. A handle 18, attached to the upper casing 15, provides means for swinging the upper casing and grid about the hinge 12 to open the waffle iron for the purpose of pouring batter onto the grid or for the removal of a baked waffle.

Extending above the upper side of the grid 10 is the integrally formed projection 19 which is substantially coextensive in length with the inner diameter of the annular heating unit 17. The lower side of grid 10 carries the integrally formed projection 20 which is substantially coextensive in length with the inner diameter of the grid 10 so that the projection 20 will be substantially coextensive with the diameter of a waffle which is baked against grid 10. The projection 19 is positioned directly above projection 20 and the latter projection is the longer because it extends across the inner diameter of the grid 10, whereas the projection 19 merely extends across the inner diameter of the annular heating unit 17. Both of the projections 19 and 20 are slotted, as shown at 21, throughout their entire lengths.

Mounted for vertical sliding movement in the slot 21 is the severing means or knife 22 having a centrally positioned, apertured part 23 by means of which it is secured to the plunger 24 with screw 25. The plunger 24 is encircled by the coil spring 26 having one of its ends resting on the top of projection 19 and the other end in yieldable engagement with the shoulder 27 fixed to the plunger 24 so that the latter is normally urged upwardly and thus holds the knife 22 in the inoperative position shown in Figs. 1 and 2. The plunger 24 extends upwardly through the aperture 28 in casing 15 and carries at its upper end the hand-engaging knob 29 whereby the knife 22 may be selectively depressed to sever a baked waffle W as shown in Fig. 3.

Figure 2:
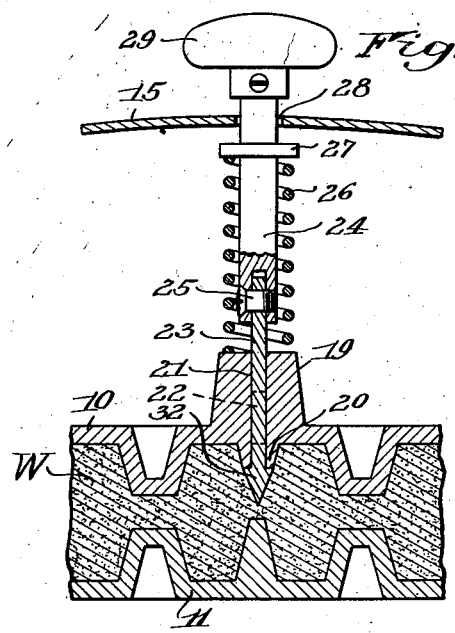
Fig. 2 is an enlarged fragmentary view showing the normal position of the knife relative to the grids and a waffle therebetween.
Figure 3:
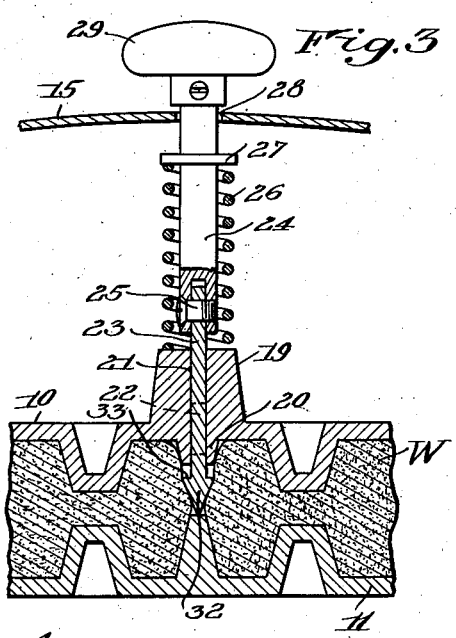
Fig. 3 is a similar view showing the position of the parts after the knife has severed the waffle.
Figure 4:
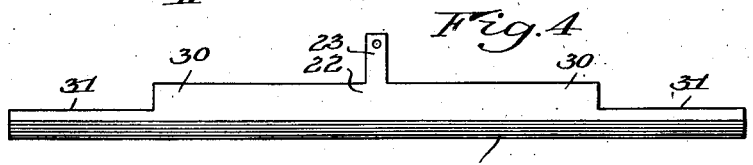
Fig. 4 is a side elevation of the severing knife.

As shown in Figs. 2-4, the knife 22 has the integral slide portions 30 which slide vertically in the slot 21 formed in projection 19 and the coextensive underlying projection 20. Adjacent the respective end portions of knife 22 are the integral slide portions 31 which slidably engage the slot 21 formed in projection 20 beyond the respective ends of projection 19. The knife 22 has a tapered cutting portion 32 formed by converging sides which are connected to the slide portions by the shoulders 33, as clearly shown in Figs. 1-3. When the knife is in the normal, inoperative position, shown in Fig. 2, the spring 26 urges the knife 22 upwardly so that the shoulders 33 are held firmly against the face of the projection 20 adjacent the slot 21. With such a construction, the waffle batter is prevented from oozing up through the slot 21.

It will be apparent from the foregoing that a waffle may be baked in my iron and may be removed in one piece in the usual manner. Quite frequently, however, when the baked waffle is removed from the iron in one piece, it is necessary to cut it into two or more pieces so as to serve two or more individuals. If such a division into two parts is necessary, it can be conveniently effected with the disclosed embodiment of my invention since the baked waffle may be selectively severed by merely depressing the plunger 24 before the waffle is removed from the iron. If it is desired to cut the waffle into four parts instead of two, it is obvious that additional knife means could be provided at right angles to the knife 22 so as to effect such a result. Such additional knife means could, for example, be selectively operated by plunger means arranged coaxially with plunger 24. Although I have shown my invention as applied to a utensil for baking a round waffle, it is obvious that it could also be applied to waffle irons which bake waffles in other shapes such as a rectangular shape, for example. These and other modifications can, of course, be made without departing from the spirit of my invention as pointed out in the appended claims.

I claim:

1. A waffle iron comprising two cooperating baking grids adapted to bake an article therebetween, one of said grids having a slot extending substantially across the grid, knife means movably mounted in the slot, yieldable means normally holding the knife means in an inoperative position, and means for moving said knife means against the action of the yieldable means to an operative position for severing the baked article to divide it into parts before removal from the iron.

2. In a waffle iron or the like, the combination of a pair of opposed grids, a casing secured to one grid, a knife mounted on said grid and extending across the face thereof, said knife being mounted for movement toward the other grid whereby an article baked between the grids may be selectively severed to divide it, yieldable means carried in the casing for normally holding the knife in inoperative relation and operating means external of the casing for moving the knife to sever the article.

3. A waffle iron comprising upper and lower grids, the upper grid having a slot formed therein and extending across the face of the grid, a knife mounted for vertical movement in said slot, a vertical plunger secured to the knife, spring means normally urging said plunger and knife upwardly, a casing above said upper grid, means in the casing for heating the grid, said casing having an aperture through which the end of the plunger extends whereby the plunger may be depressed for actuating the knife to sever a waffle between the grids to divide it into parts before removal from the iron.

4. A waffle baking device or the like comprising spaced upper and lower baking grids, one of the grids having an integral projection extending across its inner face, said projection having a slot, a knife mounted in said slot for movement towards and away from the other grid, said knife having shoulder portions adjacent its cutting edge, spring means normally urging the knife away from the other grid so that the shoulder portions are held against the projection, and means for selectively moving the knife towards the other grid to sever a waffle after it has been baked between the grids.

5. In a waffle iron or the like having two cooperating baking grids adapted to bake an article therebetween, article cutting means movably mounted on one of the grids for movement towards the other grid for selectively cutting the baked article to divide it into parts before removal from the iron, and means for actuating the cutting means.

GERHARD A. ELLESTAD.

REFERENCES CITED

The following references are of record in the file of this patent:

UNITED STATES PATENTS

| Number | Name | Date |
|---|---|---|
| 2,139,334 | Rebois | Dec. 6, 1938 |
| 1,641,455 | Quatman | Sept. 6, 1927 |
| 557,685 | Mains | Apr. 7, 1896 |
| 850,022 | Lewis | Apr. 9, 1907 |
| 1,603,941 | Edwards | Oct. 19, 1926 |
| 1,371,195 | Boyce | Mar. 8, 1921 |
| 2,167,729 | Shelton et al. | Aug. 1, 1939 |
| 2,300,061 | Purpura | Oct. 27, 1942 |
| 1,978,872 | Wharton | Oct. 30, 1934 |
| 2,207,264 | Neuberger | July 9, 1940 |
| 1,613,223 | Davis | Jan. 4, 1927 |